(12) United States Patent
Yamazaki

(10) Patent No.: US 8,737,184 B2
(45) Date of Patent: May 27, 2014

(54) HOLOGRAPHIC OPTICAL PICKUP DEVICE, OPTICAL INFORMATION RECORDING AND REPRODUCING DEVICE, AND METHOD OF RECORDING AND REPRODUCING OPTICAL INFORMATION

(71) Applicant: Hitachi Media Electronics Co., Ltd., Oshu (JP)

(72) Inventor: Kazuyoshi Yamazaki, Yamato (JP)

(73) Assignee: Hitachi Media Electronics Co., Ltd., Iwate (JP)

(*) Notice: Subject to any disclaimer, the term of this patent is extended or adjusted under 35 U.S.C. 154(b) by 0 days.

(21) Appl. No.: 13/906,619

(22) Filed: May 31, 2013

(65) Prior Publication Data

US 2013/0322225 A1     Dec. 5, 2013

(30) Foreign Application Priority Data

Jun. 1, 2012 (JP) ................................. 2012-125931

(51) Int. Cl.
*G11B 7/00* (2006.01)

(52) U.S. Cl.
USPC .................. 369/103; 369/112.03; 369/112.1; 369/112.15

(58) Field of Classification Search
None
See application file for complete search history.

(56) References Cited

U.S. PATENT DOCUMENTS

| 7,339,710 | B2 * | 3/2008 | Chuang ......................... 369/103 |
| 7,724,409 | B2 * | 5/2010 | Lin et al. ....................... 369/103 |
| 8,432,591 | B2 * | 4/2013 | Yamakawa et al. ........... 369/103 |
| 2009/0207710 | A1 | 8/2009 | Ayres et al. |

* cited by examiner

*Primary Examiner* — Muhammad N Edun
(74) *Attorney, Agent, or Firm* — Antonelli, Terry, Stout & Kraus, LLP.

(57) ABSTRACT

An optical pickup device includes a galvanometer mirror that changes an incident angle of a reference beam to an optical information recording medium, an image sensor that detects a diffracted beam from a region to be reproduced upon irradiation of the recording medium with the reference beam, and sets the detected diffracted beam to a reproduction signal, and a photodetector that detects the diffracted beam generated from a plurality of recorded regions upon irradiation of the recording medium with the reference beam. The photodetector includes a plurality of light receivers, and generates an angular error signal indicating positional shifting of the incident angle of the reference beam from a differential signal of a plurality of signals derived from the respective light receivers so as to control the angle of the galvanometer mirror.

10 Claims, 13 Drawing Sheets

HOLOGRAPHIC OPTICAL PICKUP DEVICE, OPTICAL INFORMATION RECORDING AND REPRODUCING DEVICE, AND METHOD OF RECORDING AND REPRODUCING OPTICAL INFORMATION

CLAIM OF PRIORITY

The present application claims priority from Japanese patent application serial No. JP 2012-125931, filed on Jun. 1, 2012, the content of which is hereby incorporated by reference into this application.

BACKGROUND OF THE INVENTION (1) Field of the Invention

The present invention relates to a holographic optical pickup device, an optical information recording and reproducing apparatus, and a method of recording and reproducing optical information for recording or reproducing information on an optical information recording medium using holography.

(2) Description of the Related Art

Recently, a double luminous flux angular multiplexing method has been proposed as the holography that allows high-speed recording/reproduction of large capacity of data. This approach requires control of the relative angle between the signal beam and the reference beam with high accuracy. Aiming at satisfying the requirement, the technique as disclosed in US 2009/0207710 detects the signal beam using the image sensor for searching the relative angle between the signal beam and the reference beam, calculates the SNR for each recorded angle, and predicts the subsequent relative angle based on the calculated value so as to control the relative angle of the reference beam with respect to the signal beam.

SUMMARY OF THE INVENTION

The aforementioned technique disclosed in US 2009/0207710 is capable of searching the relative angle between the signal beam and the reference beam, but has two disadvantages to be overcome. The first disadvantage is difficulty in high-speed reproduction on the ground that the control signal for the relative angle (hereinafter referred to as the angular error signal) is generated after detecting the reproduction signal by the image sensor and calculating the SNR. The second disadvantage is incapability of providing the best reproduction signal on the ground that the angle is set to the value that shifts from the relative angle which ensures provision of the best reproduction signal by a small amount for generating the angular error signal of the reference beam.

The present invention provides a holographic optical pickup device, an optical information recording and reproduction device, and a method of recording and reproducing optical information, which allow high-speed reproduction and detection of the angular error signal for providing the best reproduction signal using the double luminous flux angular multiplexing method.

The present invention provides a holographic optical pickup device for recording an information signal by irradiating an optical information recording medium with a reference beam and a signal beam to form a hologram, or reproducing the information signal by irradiating the hologram on the optical information recording medium with the reference beam. It is provided with a light source for emitting a light beam, a split element for splitting the light beam emitted from the light source into the signal beam and the reference beam, an angular variable element for changing an incident angle of the split reference beam to the optical information recording medium, a spatial light modulator for adding the information signal to be recorded to the split signal beam, an objective lens which irradiates the optical information recording medium with the signal beam to which the information signal is added, an image sensor that detects a diffracted beam generated from a region to be reproduced, and forms the diffracted beam into a reproduction signal when irradiating the optical information recording medium with the reference beam, and a photodetector different from the image sensor, which detects the diffracted beam generated from a plurality of recorded regions in the optical information recording medium when irradiating the optical information recording medium with the reference beam. An angular error signal for controlling the angular variable element is generated using a signal detected by the photodetector.

The present invention provides the holographic optical pickup device, the optical information recording and reproducing device, and the method of recording and reproducing optical information, which allows high-speed reproduction and detection of the angular error signal for providing the best reproduction signal.

DETAILED DESCRIPTION OF THE EMBODIMENT

Figure 1:
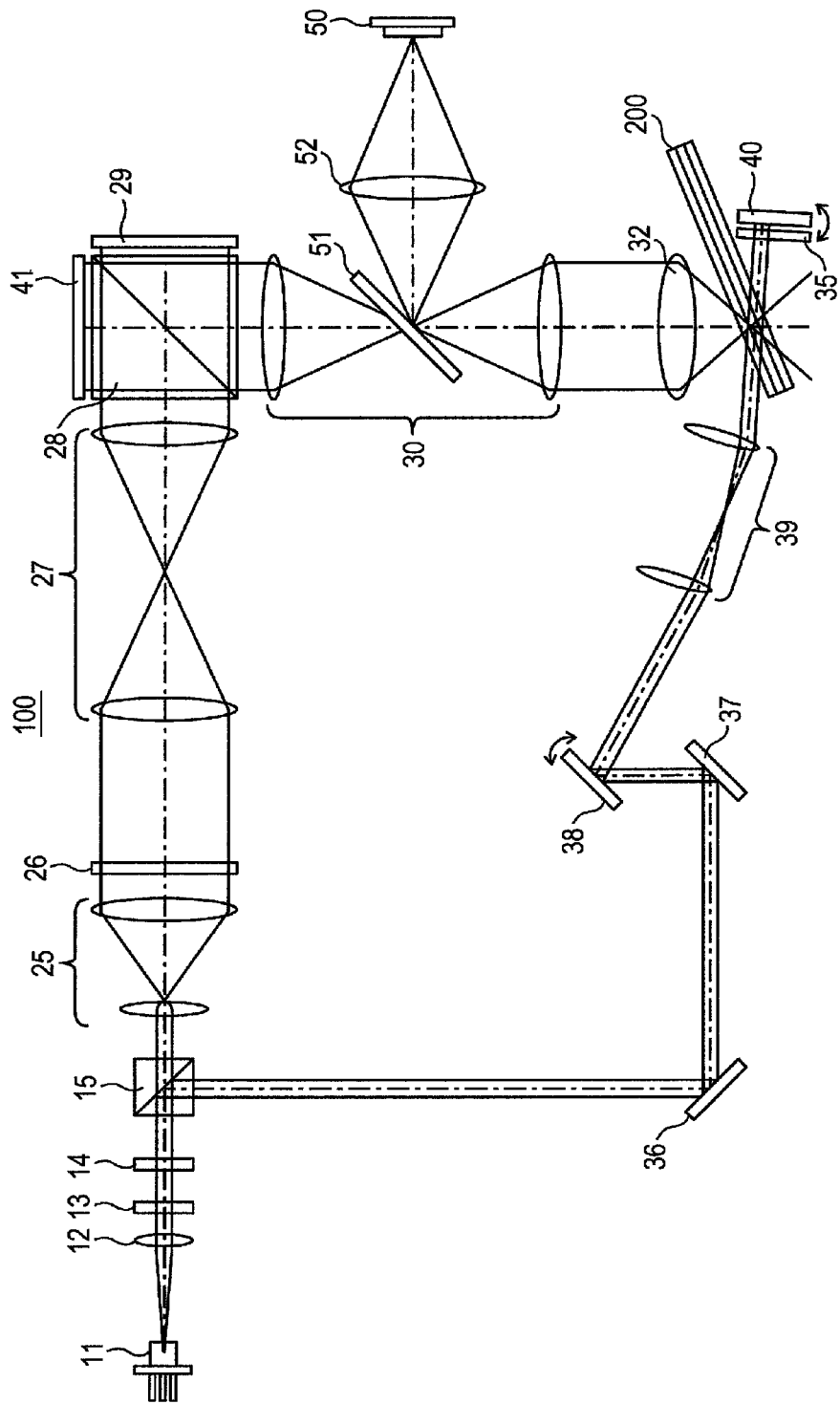
FIG. 1 is a view showing a structure of an optical system of a holographic optical pickup device according to a first embodiment.

Several embodiments according to the present invention will be described referring to the drawings.

First Embodiment

FIG. 1 is a view illustrating a structure of an optical system of a holographic optical pickup device according to a first embodiment. The holographic optical pickup device is configured to irradiate an optical information recording medium with the reference beam and the signal beam to form a hologram so as to record an information signal, or to irradiate the hologram on the optical information recording medium with the reference beam to reproduce the information signal.

A structure of an optical system 100 according to the embodiment will be explained along recording operations. The light beam emitted from a light source 11 is converted to have a desired beam diameter by a Collimator lens 12, passes through a shutter 13, and is incident on a polarized light variable element 14. The polarized light variable element 14 converts the light beam into the polarized light that contains P-polarized light and S-polarized light. The polarized light variable element 14 serves to convert the light beam into the predetermined polarized light in accordance with the recording operation or the reproducing operation. The embodiment is configured to convert the light beam into the P-polarized light and S-polarized light in recording, and into S-polarized light in reproduction. The light beam emitted from the polarized light variable element 14 is incident on a polarized light beam splitter (PBS) prism 15 that splits the light beam by transmitting the P-polarized light, and reflecting the S-polarized light. The light beam that transmits through the PBS prism 15 will be referred to as a signal beam, and the reflected light beam will be referred to as a reference beam.

The signal beam (P-polarized light) transmitting through the PBS prism 15 is converted to have the desired beam diameter by a beam expander 25. The signal beam transmitting through the beam expander 25 further transmits through a phase mask 26, a relay lens 27, and a PBS prism 28, and then is incident on a spatial light modulator 29. The spatial light modulator 29 is an optical element that adds an information signal such as two-dimensional image data to the signal beam. For example, the spatial light modulator may be configured to have small elements for polarization conversion (P-polarized light to S-polarized light) two-dimensionally arranged so as to drive the respective elements in accordance with the information signal to be recorded. The signal beam to which the information signal has been added by the spatial light modulator 29 is reflected by the PBS prism 28, and condensed in an optical information recording medium 200 via a relay lens 30 (including a spatial filter 51) and an objective lens 32.

Meanwhile, the reference beam (S-polarized light) reflected by the PBS prism 15 is further reflected by mirrors 36, 37, and incident on a galvanometer mirror 38. The reference beam reflected by the galvanometer mirror 38 is incident on the optical information recording medium 200 via a scanner lens 39. The galvanometer mirror 38 is an angular variable element capable of controlling the angle of the mirror in a direction of arrow, which realizes the angular multiplexing record while changing the incident angle of the reference beam to the optical information recording medium 200. The signal beam and the reference beam (double luminous flux) are incident on the optical information recording medium 200 while being overlapped with each other so that an interference fringe pattern is formed in the optical information recording medium 200. The interference fringe pattern is recorded in the recording medium as the hologram. In this embodiment, the hologram will be referred to as "page", and the recording region where the page is angular multiplexed will be referred to as "book".

After the information corresponding to one page is recorded in the optical information recording medium 200, the shutter 13 is closed. The information corresponding to one page to be recorded subsequently is displayed by the spatial light modulator 29. Simultaneously, the galvanometer mirror 38 is rotated by a small amount so that the incident angle of the reference beam to the optical information recording medium 200 is changed by □. Thereafter, when the shutter 13 is opened, the information to be recorded subsequently is recorded at multiplexing angle as a new page of the same book in the optical information recording medium 200. When the page number reaches the predetermined multiplexing number, it is moved to the next recording region (book). Upon movement of the book, the position of the objective lens 32 is fixed, with respect to which the optical information recording medium 200 is moved by a not shown drive unit. In this embodiment, the new book is recorded by shifting the incident angle of the reference beam with respect to the adjacent recorded book by a small angle φ. As a result, the corresponding pages are recorded while being shifted by small angle φ between adjacent recorded books. The aforementioned operation is repeated to perform the angular multiplexing record in a plurality of blocks.

A structure of the optical system 100 according to this embodiment will be explained as it is operated in reproduction. The light beam emitted from the light source 11 passes through the Collimator lens 12 and the shutter 13, and is incident on the polarized light variable element 14. The polarized light variable element 14 converts the light beam into the S-polarized light. The PBS prism 15 reflects the light beam. The reference beam reflected by the PBS prism 15 is incident on the optical information recording medium 200 via the mirrors 36, 37, the galvanometer mirror 38, and the scanner lens 39. The reference beam transmitting through the optical information recording medium 200 is further incident on a galvanometer mirror 40 via a quarter-wave plate 35. The galvanometer mirror 40 controls so that the reference beam is incident substantially perpendicularly, and is reflected in the opposite directions in association with the galvanometer mirror 38. As the reference beam transmits through the quarter wavelength plate 35 twice, it is converted from the S-polarized light into the P-polarized light. As the reference beam is incident on the optical information recording medium 200, the reproduction light that contains the information from the book recorded on the medium is generated as the diffracted beam of the P-polarized light. At this time, the reference beam is substantially larger than the book. The generated diffracted beam contains not only the one from the book to be reproduced but also the one from the adjacent book.

The diffracted beam emitted from the optical information recording medium 200 is incident on the spatial filter 51 in the relay lens 30 via the objective lens 32. An aperture of the spatial filter 51 allows only the recovered beam as the diffracted beam from the book to be reproduced. The diffracted beam from the other book is reflected by the mirror part. This makes it possible to split the beam into the diffracted beam from the book to be reproduced, which has passed through the aperture and the diffracted beam from the other book in reproduction.

The recovered beam that has passed through the aperture of the spatial filter 51 is incident on the PBS prism 28 via the relay lens 30. The recovered beam as P-polarized light transmits through the PBS prism 28, and is incident on an image sensor 41. The image sensor 41 converts the incident recovered beam into the electric signal, which is then formed into the reproduction signal (image data). When completing reproduction of one page, the galvanometer mirror 38 is rotated by a small amount so as to change the incident angle of the reference beam to the optical information recording medium 200. Then the next page in the optical information recording medium 200 is reproduced. This operation is repeated to generate the angular multiplexed reproduction signal for each page.

Meanwhile, the diffracted beam from the book other than those to be reproduced, which has been reflected by the mirror part of the spatial filter 51 is incident on a photodetector 50 via a detection lens 52. The photodetector 50 outputs the signal for generating the angular error signal of the reference beam from the received diffracted beam. The embodiment is configured to generate the angular error signal when reproducing the new book using the diffracted beam incident on the photodetector 50 in reproduction. In other words, use of the signal from the recorded book other than the one to be reproduced ensures accurate angle setting of the reference beam with respect to the book to be subsequently reproduced.

Figure 2:
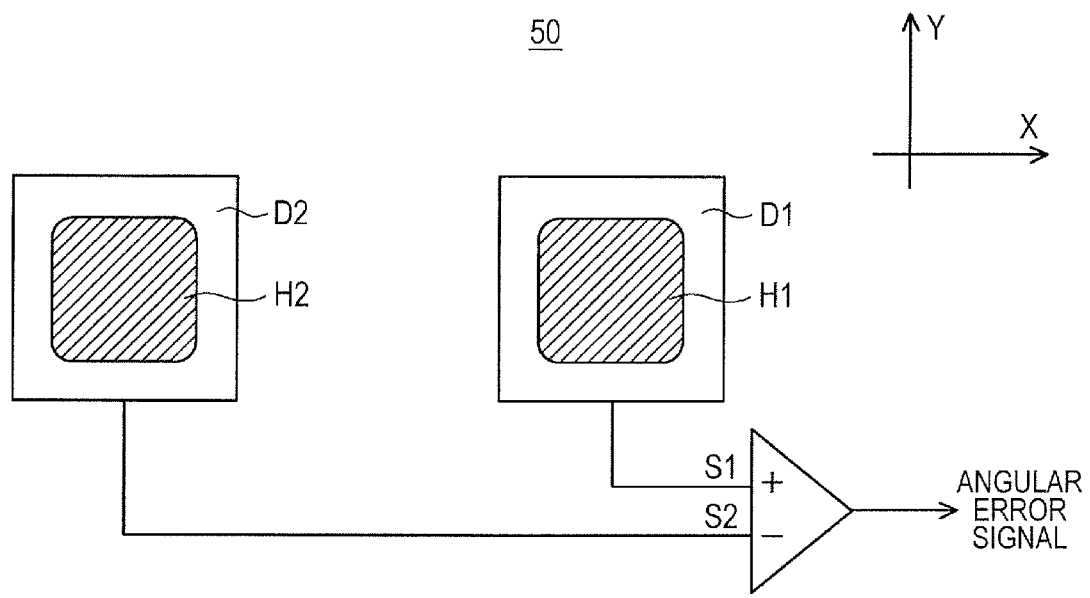
FIG. 2 is a view showing a structure of a light receiver of a photodetector 50.

FIG. 2 is a view showing a structure of a light receiver of the photodetector 50. The photodetector 50 includes two light receivers D1 and D2 arranged along the recording direction (X-direction) so that diffracted beams H1 and H2 emitted from adjacent books at both sides of the book to be reproduced are detected in different light receiving planes. Assuming that signals derived from those two light receivers D1 and D2 are designated as S1 and S2, the angular error signal (AES) may be expressed by the following formula (1).

$$AES = S1 - S2 \quad (1)$$

The differential calculation of the angular error signal AES is performed by a servo signal generation circuit of the optical information recording and reproducing device, for example. The control of determining angle of the reference beam is executed by driving the galvanometer mirror 38 via the servo control circuit so that the calculated error signal becomes 0.

The angular error signal and the angle determination control of the reference beam according to the embodiment will be described in detail. For the recording method to the optical information recording medium, the incident angles of the reference beams to the corresponding pages between adjacent books are shifted by the small angle.

Figure 3:
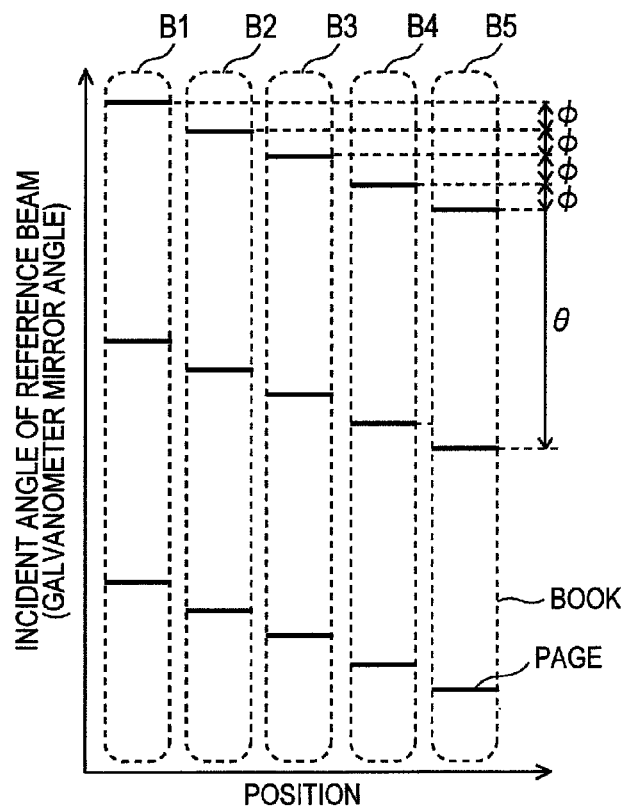
FIG. 3 is a view illustrating an incident angle of the reference beam with respect to an adjacent book in recording.

FIG. 3 is a view showing the incident angle of the reference beam to the adjacent book in recording. The X-axis denotes a position of the book in the recording direction, and Y-axis denotes the respective books and incident angles of the reference beams of the respective pages contained therein. The incident angle of the reference beam is dependent on the rotating angle of the galvanometer mirror 38. Amount of change in the incident angle of the reference beam becomes twice the amount of change in the rotating angle of the galvanometer mirror. The drawing shows five consecutive books B1 to B5 (regions defined by dashed lines). The incident angles of the reference beams between the respective books are set to values which are different from each other by a small angle φ. Each solid line in the respective books denotes the incident angle of the reference beam in recording of the respective pages. In reproduction, the incident angle of the reference beam is set as indicated by the solid line of FIG. 3 so as to obtain the recovered beam that maximizes the intensity of the diffracted beam.

The process of generating the angular error signal from the diffracted beam from the book other than the one to be reproduced will be described. For simplicity, it is assumed that the book to be reproduced is designated as B2, and three consecutive books B1, B2 and B3 are focused. The single book is represented by angular multiplexing of three pages.

Figure 4:
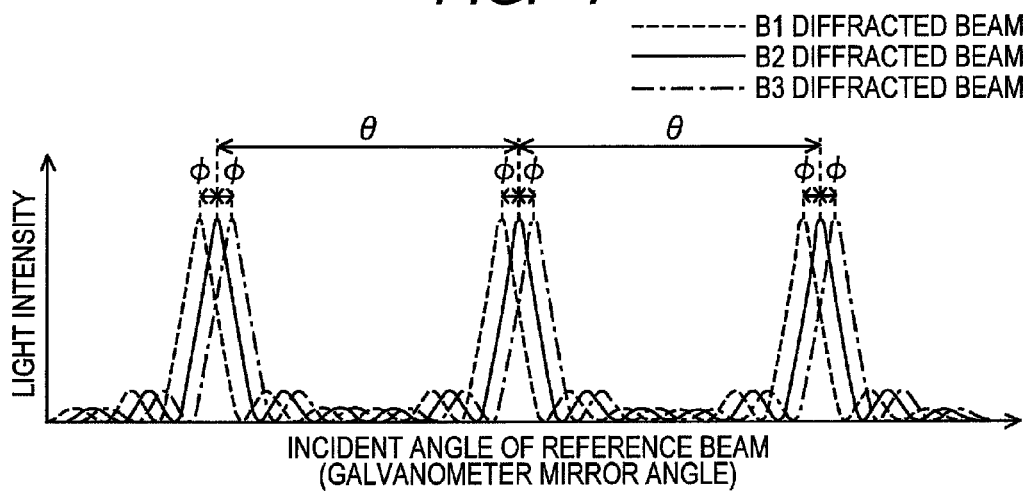
FIG. 4 is a view showing change in intensity of the diffracted beam from each book in response to change in the incident angle of the reference beam in reproduction.

FIG. 4 shows change in intensity of the diffracted beam from each book in response to change in the incident angle of the reference beam in reproduction. This graph shows the diffracted beams from the respective pages of the books B1, B2 and B3 shown in FIG. 3. The incident angle of the reference beam is dependent on the rotating angle of the galvanometer mirror 38. The incident angles of the reference beams in recording of the books B1, B2 and B3 are different from one another by small angle φ. It is clear that the reference beam angle that allows the reproduction signal of the book B2 to reach the peak may be set by adjusting the angle at an intermediate position between two reference beam angles that allow the diffracted beams from the books B1 and B3 to reach the peaks. This embodiment is configured to calculate the difference in intensity of the diffracted beams between the books (books B1 and B3) adjacent to the book (B2) to be reproduced, and to obtain the shifting of the reference beam angle from the angular error signal.

Figure 5:
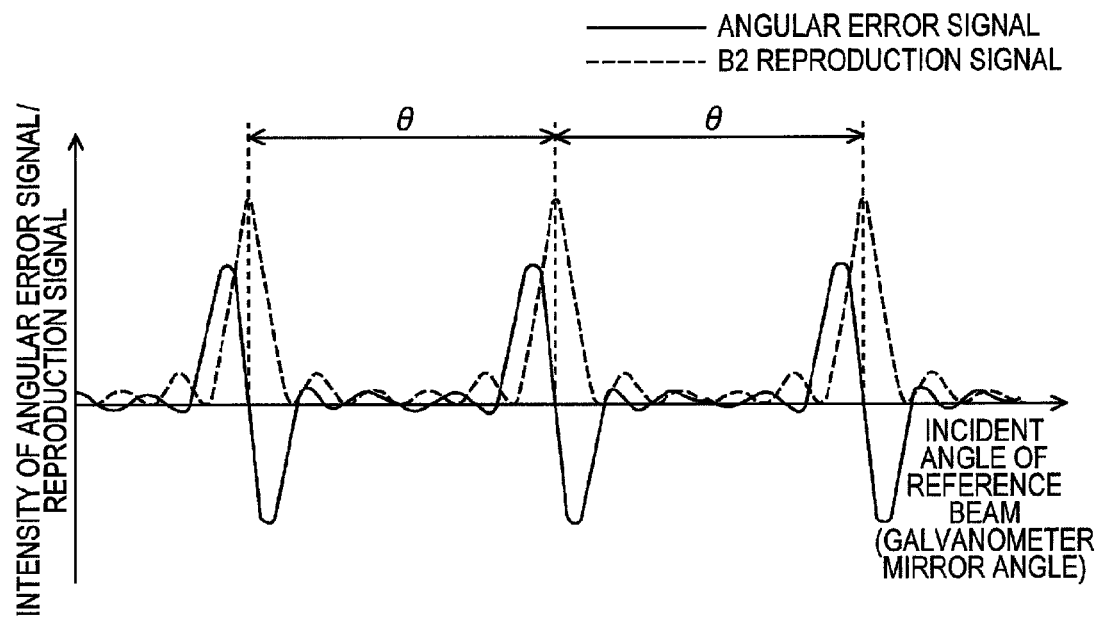
FIG. 5 is a view showing each change in the angular error signal and the reproduction signal in response to change in the incident angle of the reference beam.

FIG. 5 shows changes in the angular error signal and the reproduction signal of the book B2 in response to change in the incident angle of the reference beam (rotating angle of the galvanometer mirror 38). The angular error signal becomes 0 at a point where the reproduction signal of the book B2 reaches the peak. The positive and negative signals are detected at both sides of the peak. This provides the amount of correction (size and direction) for driving the galvanometer mirror 38 so as to allow the reproduction signal to reach the peak, that is, the angular error signal is set to 0, and makes it possible to accurately control the angle of the galvanometer mirror. As a result, the stable reproduction is ensured.

It may be considered to allow the image sensor 41 on which the recovered beam is incident to generate the angular error signal. However the image sensor 41 is required to detect the image signal. Meanwhile, the photodetector 50 according to this embodiment ensures high frequency driving for detecting only light intensity. It is advantageous to perform high-speed control. Compared with the technology as disclosed in US 2009/0207710, this embodiment is capable of controlling the angle of the galvanometer mirror to the position where the recovered beam intensity is maximized, thus providing the best reproduction signal.

As described above, the holographic optical pickup device according to this embodiment includes the photodetector 50 separately provided from the image sensor 41. The device allows the photodetector 50 to detect the diffracted beams from two books adjacent to the book to be reproduced in reproduction, and generates the angular error signal for controlling the angular variable element (galvanometer mirror 38). This makes it possible to perform high-speed and stabilized reproduction.

Several modified examples of this embodiment will be described.

The embodiment is configured to detect the diffracted beams from the books other than the one to be reproduced so as to detect the angular error signal. The position error signal and the focus error signal with respect to the book to be reproduced may be generated using the similar diffracted beams.

Figure 6:
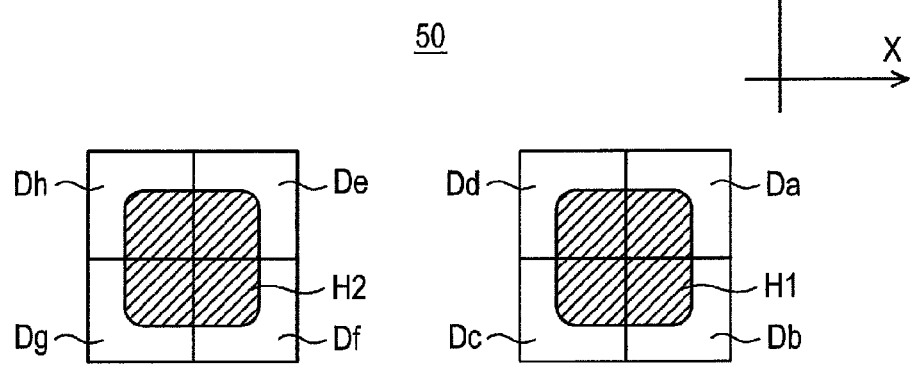
FIG. 6 is a view showing a modified example of the photodetector 50.

FIG. 6 shows a modified example of the photodetector 50. Each of the light receivers D1 and D2 shown in FIG. 2 is divided into four sections to form eight light receiving planes Da to Dd, and De to Dh in total. The light receiving planes Da to Dd receive incident diffracted beam from an adjacent book H1, and the light receiving planes De to Dh receive incident diffracted beam from an adjacent book H2. Signals from the respective light receiving planes Da to Dd, and De to Dh are calculated to allow detection of a positional shifting signal of the book to be reproduced. The detection is performed using the phenomenon that the diffracted beams from the books H1 and H2 on the light receivers D1 and D2 of the photodetector 50 are shifted in association with positional shifting of the position of the book at which the diffracted beam is generated.

Assuming that signals derived from the light receiving planes Da to Dd, and De to Dh are designated as Sa to Sd, and Se to Sh, respectively, the angular error signal (AES) and position error signals (XPES, YPES) on the optical information recording medium are expressed by the following formulae (2a), (2b) and (2c).

$$AES = (Sa + Sb + Sc + Sd) - (Se + Sf + Sg + Sh) \tag{2a}$$

$$XPES = (Sa + Sb + Se + Sf) - (Sc + Sd + Sg + Sh) \tag{2b}$$

$$YPES = (Sa + Sd + Se + Sh) - (Sb + Sc + Sf + Sg) \tag{2c}$$

The XPES and YPES represent position error signals in X-direction and Y-direction on the optical information recording medium. Referring to the example shown in FIG. 6, each of the two detectors D1 and D2 is divided into four sections. However, the single detector may be divided into four sections to obtain the position error signal as well. The single detector may also be divided into two sections to obtain the position error signal in a predetermined direction (X-direction or Y-direction).

Furthermore, the light beam reflected by the spatial filter 51 shown in FIG. 1 may be guided to an additional photodetector (not shown) so as to generate a focus error signal. The focus error signal may be generated by providing the structure with a knife edge, for example, to execute the stable focus control. The mirror part is provided around the aperture of the spatial filter 51. However, the prism may be used for forming the structure.

Second Embodiment

Figure 7:
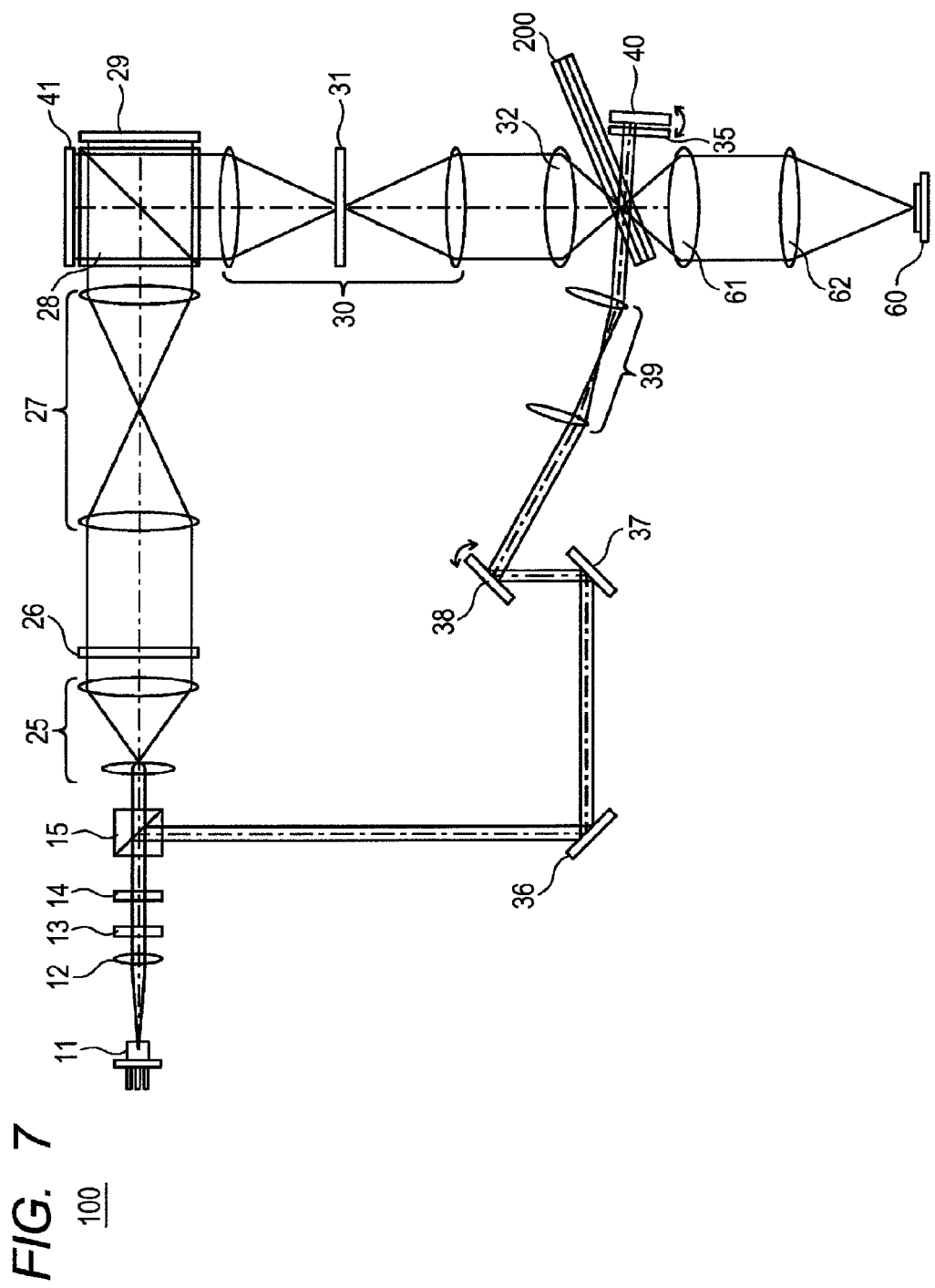
FIG. 7 is a view showing a structure of an optical system of the holographic optical pickup device according to a second embodiment.

FIG. 7 shows a structure of an optical system of the holographic optical pickup device according to a second embodiment. In this embodiment, a photodetector 60 for generating the angular error signal of the reference beam is at the position different from the first embodiment (FIG. 1), and opposite the objective lens 32 with respect to the optical information recording medium 200. A spatial filter 31 is an optical element with an aperture, and allows passage of only the diffracted beam from the book corresponding to the condensing position (reproducing position). As the method of generating the angular error signal of the reference beam and the principle of the control method of this embodiment are common to the first embodiment, redundant descriptions will be omitted.

In this embodiment, the information is recorded on the optical information recording medium while shifting the incident angles of the reference beams to the corresponding pages between adjacent books each by a small angle $\phi$.

In this embodiment, the reference beam is incident on the optical information recording medium 200 via the galvanometer mirror 38 and the relay lens 39 in reproduction. The diffracted beam from the book already recorded on the optical information recording medium 200 is generated at the side opposite (back surface of the optical information recording medium 200) the objective lens 32. The diffracted beam is incident on the photodetector 60 via lenses 61 and 62. The photodetector 60 receives the incident diffracted beams from not only the book adjacent to the one to be reproduced but also the book to be reproduced. The angular error signal is then generated using the signal output from the photodetector 60.

The reference beam that has passed through the optical information recording medium 200 is reflected by a galvanometer mirror 40, and is incident on the optical information recording medium 200 again. Then the diffracted beam (recovered beam) that contains information from the book to be reproduced is generated. The recovered beam is emitted toward the objective lens 32 and incident on the image sensor 41 after passing through the aperture of the spatial filter 31. The reproduction signal is then generated.

If the photodetector 60 has the light receiving plane with the same structure as that of the first embodiment (FIGS. 2 and 6), the angular error signal of the incident angle of the reference beam (galvanometer mirror 38) may be generated by performing the similar calculation to that of the first embodiment. Focusing on the phenomenon that the photodetector 60 receives the incident diffracted beam from the book to be reproduced simultaneously, this embodiment is configured to directly use the diffracted beam (hereinafter referred to as the recovered beam H0) from the book to be reproduced.

Figure 8:
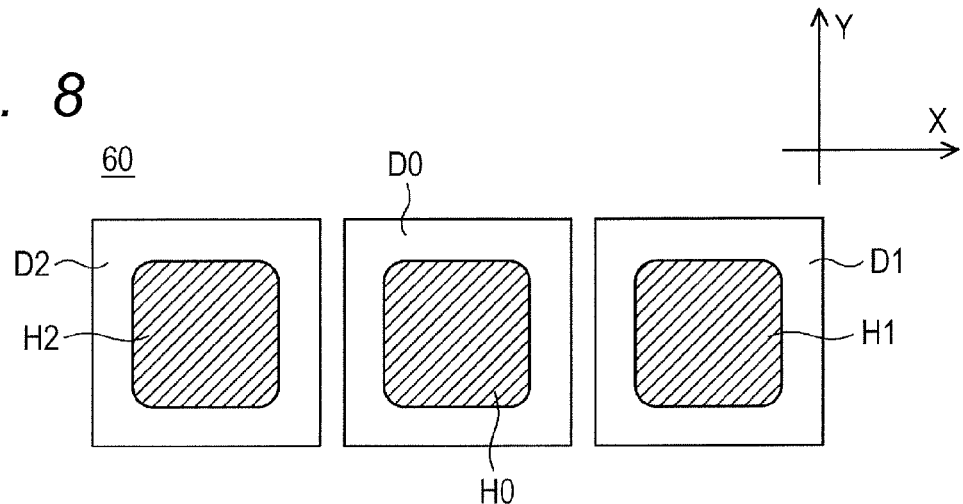
FIG. 8 is a view showing a structure of a photodetector 60.

FIG. 8 shows the structure of the photodetector 60. The photodetector 60 includes three light receivers D1, D0 and D2 arranged in the recording/reproducing direction (X-direction). In reproduction, the light receiver D0 detects the light beam H0 from the book to be reproduced, and two other light receivers D1 and D2 detect the diffracted beams H1 and H2 from the adjacent books so as to generate the angular error signals. Those signals are combined to execute the angular control of the reference beam. In this case, detection of not only the angular error signal but also the signal of the recovered beam H0 detected by the light receiver D0 ensures confirmation that the reference beam angle is set to maximize the reproduction signal.

Furthermore, it is possible to generate the positional shift signal of the book to be reproduced and the focus error signal in addition to the angular error signal by detecting the diffracted beam from those other than the book to be reproduced.

Figure 9A:
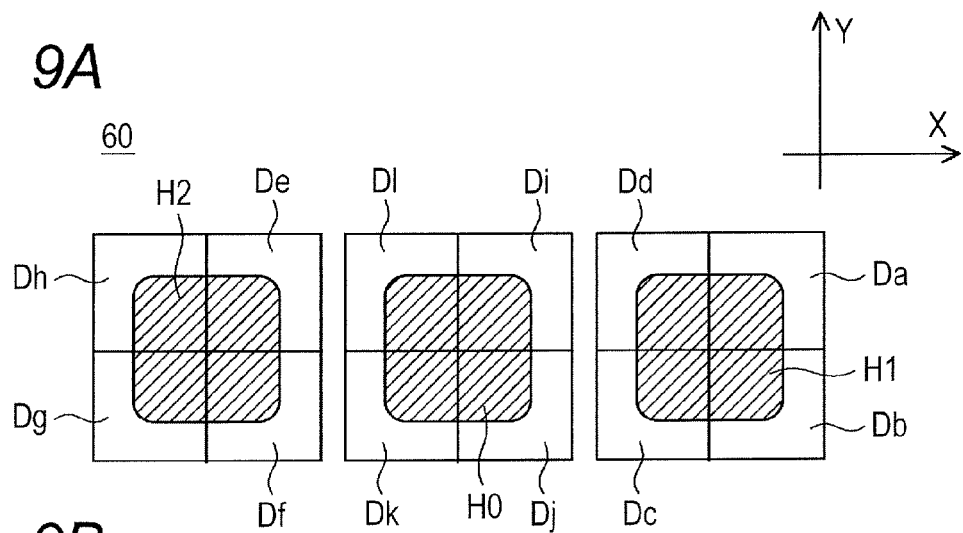
FIGS. 9A and 9B show modified examples of the photodetector 60.
Figure 9B:
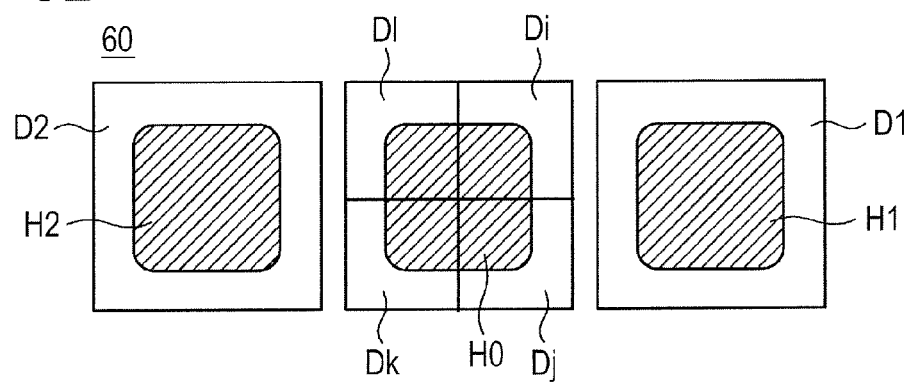

FIGS. 9A and 9B show modified examples of the photodetector 60. FIG. 9A shows that each of the light receivers D1, D0 and D2 is divided into four sections to form the light receiving planes Da to Dd, Di to Dl, and De to Dh, respectively. The position error signal may be detected by calculating signals from the respective light receiving planes. The detection is performed using the phenomenon that the position on which the diffracted beam is incident to the respective light receivers on the photodetector 60 is shifted in association with positional shifting of the book relative to the light beam.

Assuming that signals derived from the respective light receiving planes Da to Dd, De to Dh and Di to Dl are designated as Sa to Sd, Se to Sh, and Si to Sl, the angular error signal (AES) and the position error signals (XPES, YPES) on the optical information recording medium may be expressed by the following formulae (3a), (3b) and (3c).

$$AES = (Sa + Sb + Sc + Sd) - (Se + Sf + Sg + Sh) \tag{3a}$$

$$XPES = (Sa + Sb + Se + Sf + Si + Sj) - (Sc + Sd + Sg + Sh + Sk + Sl) \tag{3b}$$

$$YPES = (Sa + Sd + Se + Sh + Si + Sl) - (Sb + Sc + Sf + Sg + Sj + Sk) \tag{3c}$$

The XPES and YPES denote the position error signals in X-direction and Y-direction on the optical information recording medium, respectively.

In this example, each of three light receivers of the photodetector 60 is divided into four sections. However, the light receiver D0 may only be divided into four sections as shown in FIG. 9B so as to obtain the position error signals in X-direction and Y-direction. Furthermore, the position error signal in one direction may be obtained by dividing the single light receiver into two sections.

Third Embodiment

Figure 10:
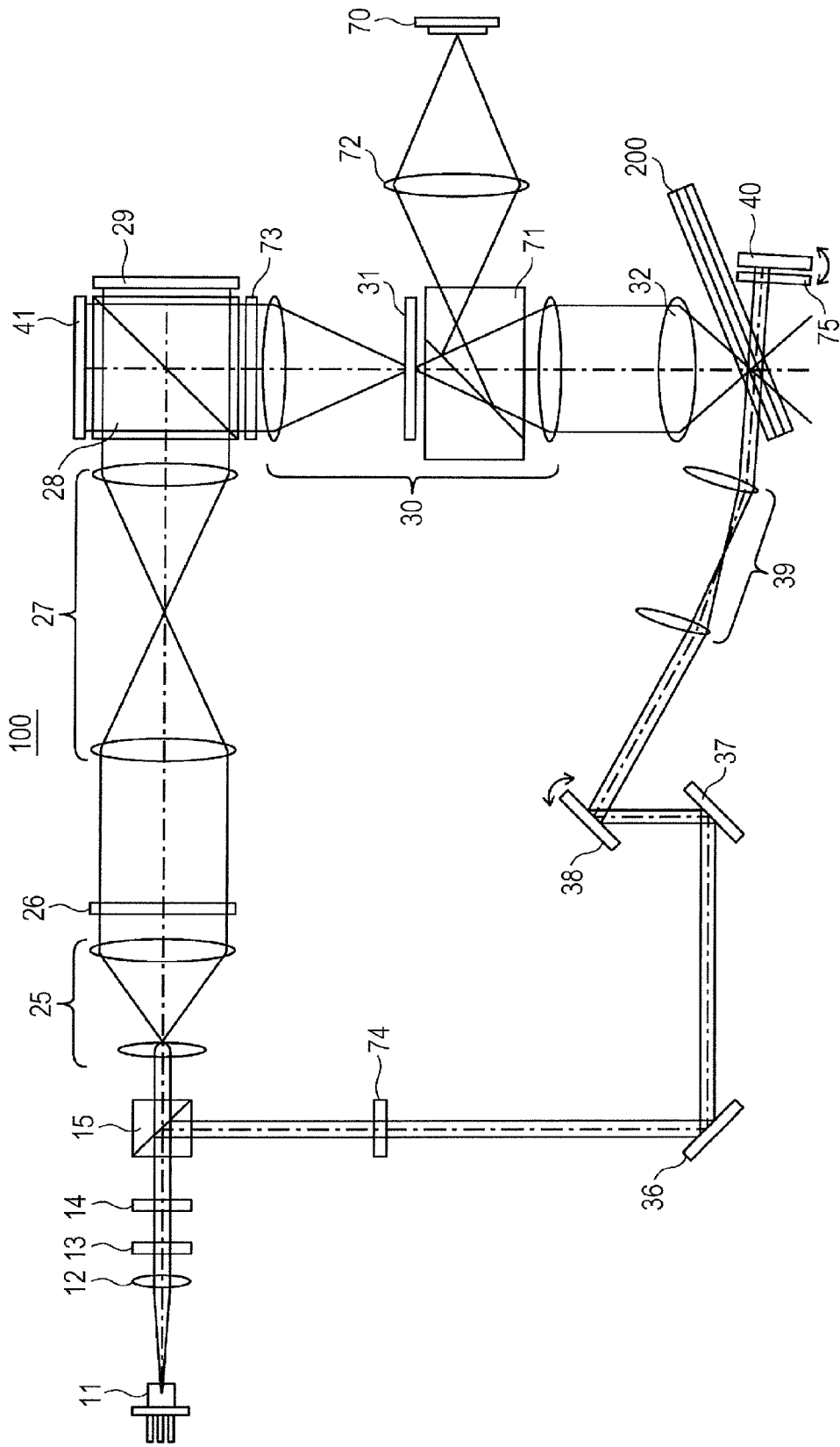
FIG. 10 is a view showing a structure of an optical system of the holographic optical pickup device according to a third embodiment.

FIG. 10 shows a structure of the optical system of the holographic optical pickup device according to a third embodiment. In this embodiment, a photodetector 70 is provided at the side of the objective lens 32 likewise the first embodiment (FIG. 1). The photodetector 70 is capable of detecting the recovered beam H0 in reproduction likewise the second embodiment. In this embodiment, several elements are added/changed for the purpose of recording/reproducing the book with no difficulty. The redundant explanations similar to those of the first and the second embodiments will be omitted. This embodiment is configured to record the information on the optical information recording medium while shifting the incident angles of the reference beams to the corresponding pages between adjacent books each by the small angle φ.

In this embodiment, in reproduction, the reference beam (S-polarized light) is converted into the P-polarized light by a half wavelength plate 74, and incident on the optical information recording medium 200 via the galvanometer mirror 38. The reference beam further transmits through the optical information recording medium 200, and is reflected by the galvanometer mirror 40. The beam is then incident on the optical information recording medium 200 again. The reference beam as the P-polarized light passes through the wavelength plate 75 (at arbitrary phase angle) twice so as to be converted into the polarized component formed by combining the S-polarized light and P-polarized light. The diffracted beam as the combination of the S-polarized beam and P-polarized beam is generated from the book already recorded on the optical information recording medium 200, and is emitted toward the objective lens 32. At this time, the reference beam is sufficiently larger than the book, and contains the diffracted beam from not only the book to be reproduced but also the adjacent book.

The diffracted beams are incident on a PBS prism 71 in the relay lens 30 via the objective lens 32. The PBS prism 71 allows transmission of the P-polarized component of the incident diffracted beam, and reflects the S-polarized component. The diffracted beam (S-polarized light) reflected by the PBS prism 71 is incident on the photodetector 70 via a detection lens 72. The angular error signal is generated using the signal output from the detector 70.

In this embodiment, the S-polarized component of the diffracted beam from the medium 200 is directly incident on the photodetector 70 which is capable of receiving the diffracted beam of not only the adjacent book that has been already recorded but also the book to be reproduced. In other words, in reproduction, this embodiment is capable of detecting the reproduction light H0 likewise the second embodiment, and accordingly, the angular error signal may be generated in reproduction using the reproduction light H0. The calculation may be performed in the similar way to the second embodiment using the photodetector 60 with the light receiving plane as shown in FIGS. 8, 9A and 9B, for example.

This embodiment has the advantage that the control accuracy is improved by directly detecting the diffracted beam from the book to be reproduced compared with the case of detecting the diffracted beam from the adjacent book. This embodiment is configured to arrange the photodetector 70 at the side of the objective lens 32, which prevents increase in overall size of the optical pickup device.

The recording/reproducing operations performed by the structure of the embodiment will be described.

In recording, the signal beam (P-polarized light) becomes the signal beam (S-polarized light) to which the information signal is added by a spatial light modulator 29. Thereafter, the beam is condensed on the optical information recording medium 200 via a polarized light variable element 73, the relay lens 30 (including the spatial filter 31 and the PBS prism 71), and the objective lens 32. The polarized light variable element 73 performs conversion of the light into the predetermined polarized light in accordance with the recording or reproducing operation. In this case, in recording, the S-polarized light is converted into the P-polarized light, and in reproduction, the incident polarized light is directly emitted. Meanwhile, the reference beam (S-polarized light) is converted into the P-polarized light by the half wavelength plate 74, and incident on the optical information recording medium 200 via the galvanometer mirror 38 and the like. At this time, the galvanometer mirror 38 is controlled so that the reference beam is incident while having the incident angles to the corresponding pages between the adjacent books shifted by the small angle φ. The aforementioned signal beam and the reference beam are incident on the optical information recording medium 200 while being overlapped with each other so that the information signal is recorded as the hologram.

In reproduction, the reference beam (S-polarized light) is converted into the P-polarized light by the half wavelength plate 74, and incident on the optical information recording medium 200 via the galvanometer mirror 38 and the like. The beam further transmits through the optical information recording medium 200, and is reflected by the galvanometer mirror 40 via the wavelength plate 75. It is then incident on the optical information recording medium 200 again. The reference beam is converted into the polarized light component as synthesis of the S-polarized light and the P-polarized light. The diffracted beam formed as the synthesis of the S-polarized light and the P-polarized light is generated from the book already recorded on the optical information recording medium 200 so as to be emitted toward the objective lens 32.

The diffracted beam is incident on the PBS prism 71 via the objective lens 32. The P-polarized light component transmits through the PBS prism, and is incident on the spatial filter 31. The spatial filter 31 has the aperture that allows passage of only the recovered beam from the book to be reproduced, and no passage of the diffracted beam from the other books. This may separate only the recovered beam from the book to be reproduced. The recovered beam that has transmitted through the spatial filter 31 further transmits through the polarized light variable element 73 (in reproduction, the polarized light conversion is not performed). Then the beam transmits through the PBS prism 28, and is incident on the image sensor 41 so as to generate the reproduction signal.

In this embodiment, the PBS prism 71 is provided for splitting the light beam. However, a generally employed BS prism may also be used.

The aforementioned first, second, third embodiments may be modified as follows.

The optical system may be configured to allow detection of the diffracted beam from the optical information recording medium without being limited to those embodiments. In the embodiments, the galvanometer mirror 38 is employed for angular control in the double luminous flux angular multiplexing method. However, the acousto-optical device and the angular variable element such as MEMS (Micro-Electro-Mechanical Systems) may be employed. The third embodiment employs the galvanometer mirror 38 for the angular control of the reference beam. However, it is possible to execute the control using the galvanometer mirror 40 in reproduction.

This embodiment is configured to detect the diffracted beam from the book other than the book to be reproduced so that the angular error signal is generated. However, the book to be detected may be arbitrarily positioned in any direction, and is not necessarily adjacent to the book to be reproduced. It is sufficient that the recorded angles between corresponding pages of at least two books are shifted by a predetermined amount.

In the respective embodiments, the recorded angles between the corresponding pages of different books on the optical information recording medium may be shifted by a predetermined amount without limiting the recording method. For example, the angle may be recorded with respect to the machine accuracy, or controlled based on the signal from the photodetector. In the respective embodiments, the small angle $\phi$ is set as a constant value. However, the angular selectivity varies in accordance with the angle of the reference beam. Accordingly, the small angle $\phi$ may be made variable in accordance with the angle of the reference beam.

Fourth Embodiment

Figure 11:
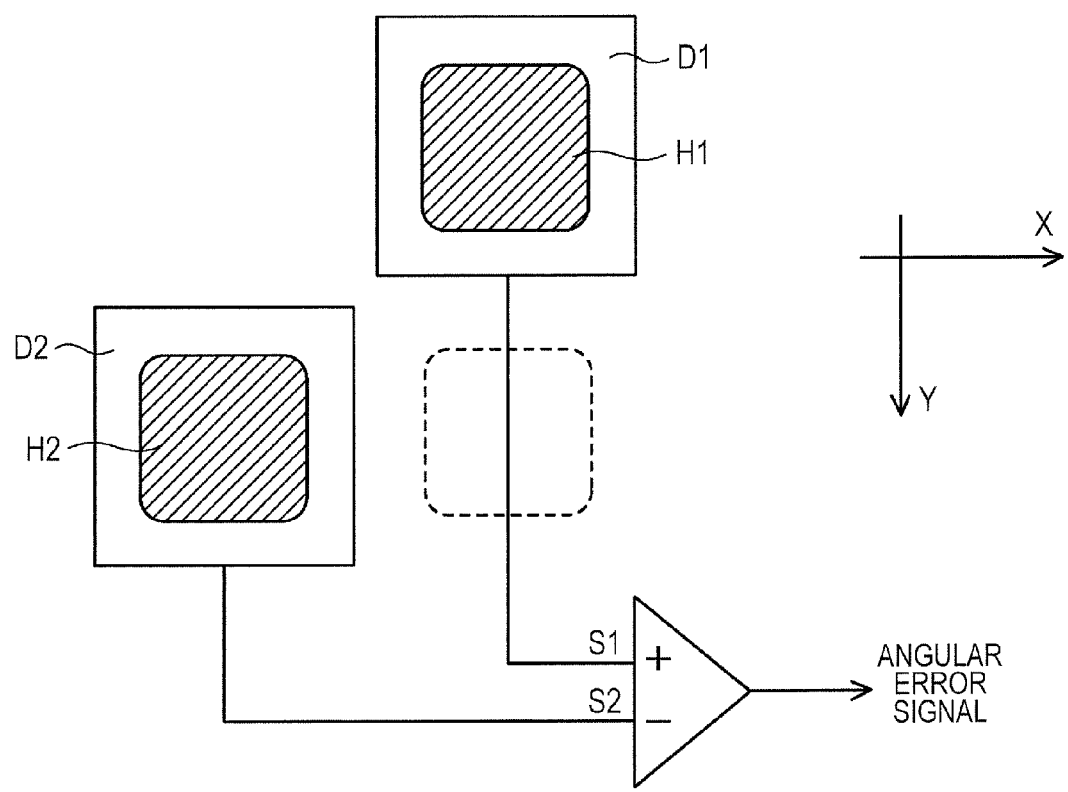
FIG. 11 is a view showing a structure of a photodetector of the holographic optical pickup device according to a fourth embodiment.

FIG. 11 shows a structure of a photodetector of the holographic optical pickup device according to a fourth embodiment. The optical system has the same structure as the one described in the first embodiment. This embodiment is different from the first to the third embodiments in the structure of the light receiver of the photodetector 50. The photodetector 50 has two light receivers D1 and D2 arranged at diagonal positions for detecting diffracted beams H1 and H2 from the two recorded books, respectively. The dashed line of the drawing denotes the virtual position corresponding to the book to be recorded. Specifically, one of the two light receivers D1 and D2, that is, D2 is at the position shifted in the recording direction (X-direction) with respect to the book to be recorded, and the other one, that is, D1 is at the position shifted in the direction (Y-direction) orthogonal to the recording direction.

This embodiment is suitable for two-dimensional recording on the optical information recording medium with square or rectangular shape. However, it is suitable for the optical information recording medium with circular or any other shape. The first to the third embodiment are configured to detect the angular error signal in reproduction. Meanwhile, this embodiment is configured to detect the angular error signal in recording/reproducing. The method of recording on the optical information recording medium 200 will be described hereinafter.

Figure 12:
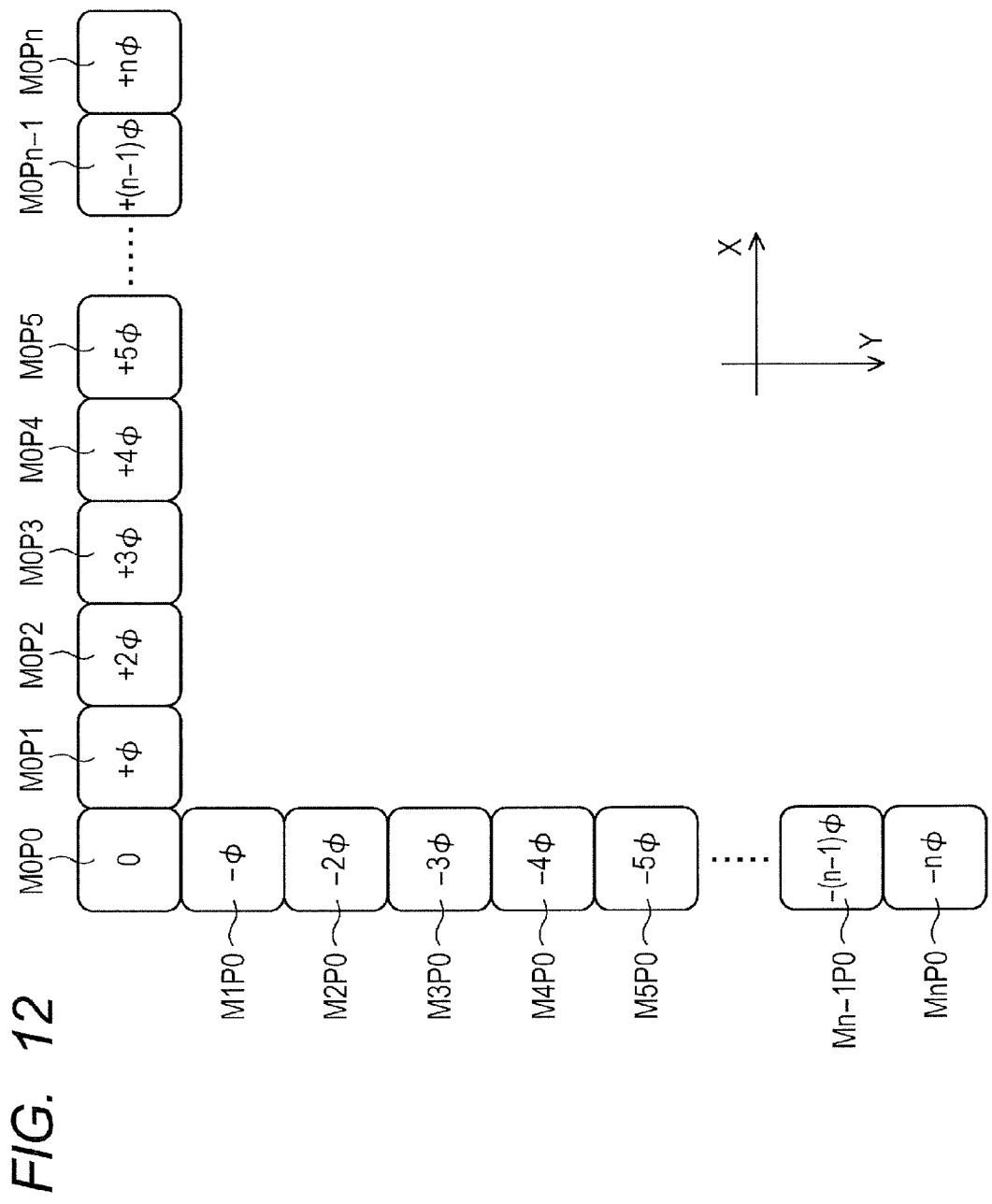
FIG. 12 is an explanatory view of a recording method of a reference book.

FIG. 12 is an explanatory view representing the recording method of a reference book. The books as the reference are recorded in an arrangement of 1×1 in X- and Y-directions on the optical information recording medium 200. Each number of the respective books denotes the angular shift amount of the reference beam of the page recorded on the book when it is assumed that the book M0P0 as the zero-point serves as the criteria. Referring to the drawing, the pages corresponding to adjacent books in X- and Y-directions are recorded while being shifted by small angle $\phi$. The page of the book at the end in the X-direction is recorded while being shifted by the angle of +n$\phi$, and the page at the end in the Y-direction is recorded while being shifted by the angle of −n$\phi$. When recording the reference book, the reference beam angle is realized with machine accuracy of the galvanometer mirror 38.

Figure 13:
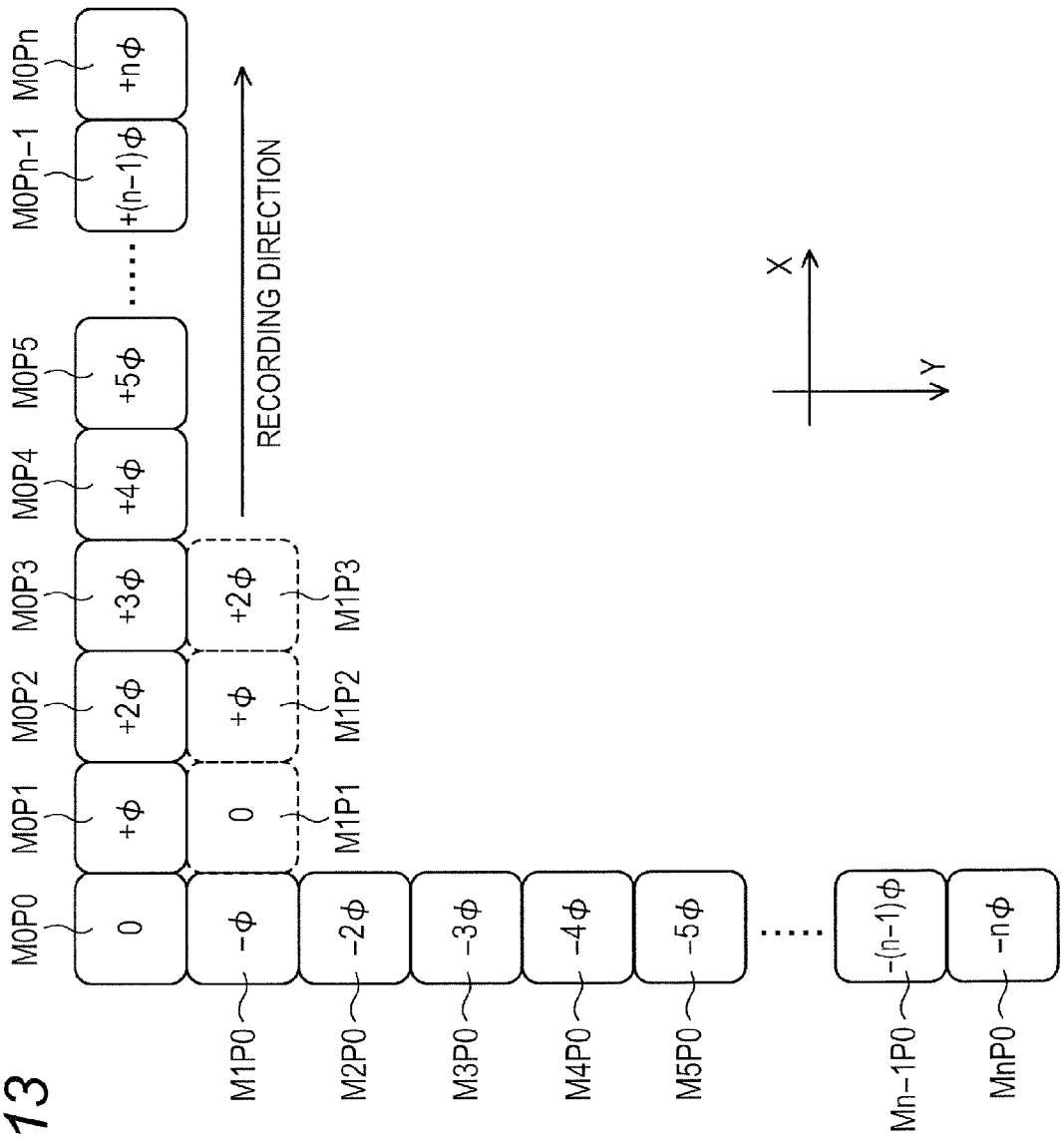
FIG. 13 is an explanatory view of a recording method after forming the reference book.

FIG. 13 is an explanatory view representing the recording method after forming the reference books. When forming a new book M1P1, the optical information recording medium 200 is moved so that the target position is irradiated with the signal beam and the reference beam. In this case, the reference beam has the effective diameter on the optical information recording medium, sufficiently larger than the signal beam. For such reason, incidence of the reference beam to pages of the recorded reference books M0P1 and M1P0 at predetermined angles generates the diffracted beam. The generated diffracted beam is incident on the photodetector 50 as shown in FIG. 11. That is, the diffracted beam H1 from the page of the book M0P1 is detected by the light receiver D1, and the diffracted beam H2 from the page of the book M1P0 is detected by the light receiver D2.

Assuming that the signals derived from those two light receiving planes D1 and D2 are designated as S1 and S2, the angular error signal (AES) may be generated by performing the similar calculation to the formula (1) of the first embodiment. Based on the angular error signal, the galvanometer mirror 38 is controlled so as to record the respective pages of the book M1P1. As a result, the recorded angle of the page of the book M1P1 becomes the value intermediate between those of the corresponding pages of the book M0P1 and the book M1P0. That is, it is set to 0 as the intermediate value between +$\phi$ and −$\phi$.

Likewise, the page of the book M1P2 is recorded using the diffracted beams from pages of the books M0P2 and M1P1. The recording operations with respect to the books on the same line are performed to complete the book on the second line. Upon completion of recording the second line, the operation starts at the area next to the book M2P0 for recording pages on the third line. The aforementioned operations are repeated for each line so that entire surface of the optical information recording medium 200 is two-dimensionally recorded in X and Y directions.

Meanwhile, for reproduction, the photodetector 50 shown in FIG. 11 is employed to receive the diffracted beam from the adjacent book in the similar manner to the recording so as to generate the angular error signal. The light receiver for reproduction may be formed by combining those described in the first to the third embodiments.

This embodiment is configured to generate the angular error signal using the diffracted beam from the recorded book. The holographic optical pickup device according to this embodiment is provided with the photodetector that detects the diffracted beam from the book different from the book to be recorded/reproduced in recording/reproduction. The photodetector detects the diffracted beams from at least two books which are different from the book to be recorded/reproduced so as to generate the angular error signal. This makes it possible to perform high-speed recording/reproduction in stable state.

This embodiment may be modified as described below.

Figure 14:
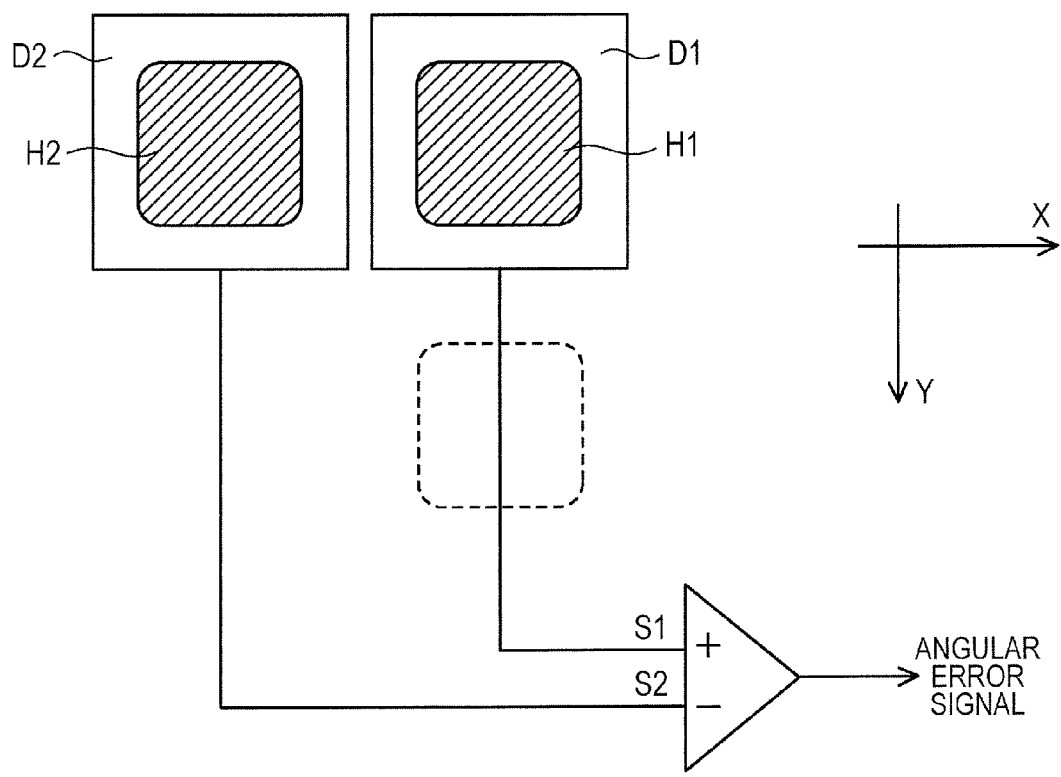
FIG. 14 is a view showing a modified example of the photodetector 50.

FIG. 14 shows a modified example of the photodetector 50 that includes the light receivers D1 and D2 arranged in the X-direction as the recording/reproducing direction on the line (at the position shifted toward Y-direction) different from the virtual position (shown by dashed line) corresponding to the book to be recorded/reproduced. In other words, the angular error signal of the book to be recorded/reproduced on the adjacent line is generated based on detection signals from the light receivers D1 and D2.

Figure 15:
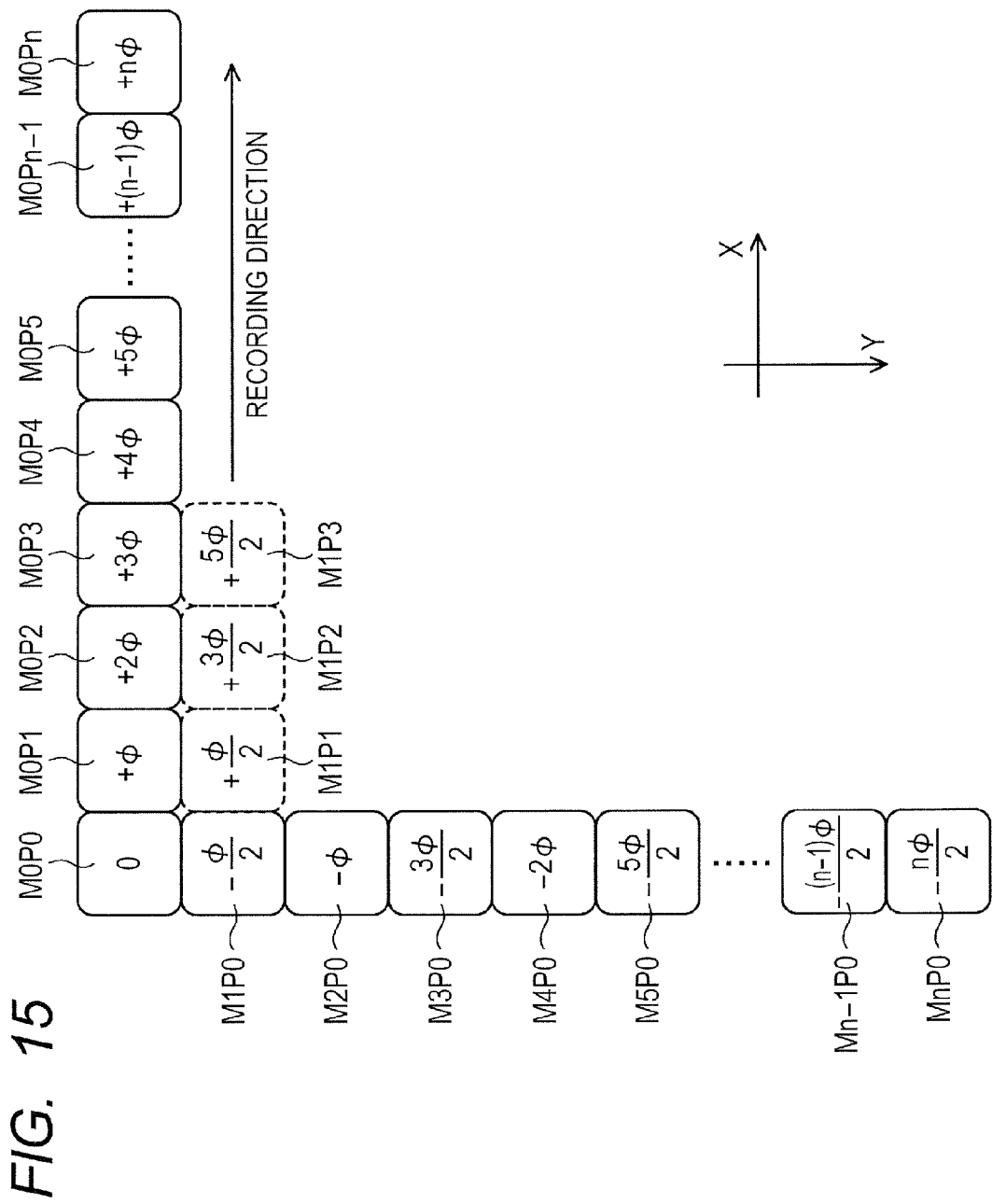
FIG. 15 is an explanatory view of the recording method using the photodetector of FIG. 14.

FIG. 15 is an explanatory view of the recording method using the photodetector shown in FIG. 14. When forming the reference book, the corresponding page of the adjacent book in the X-direction is recorded while being shifted by the small angle ϕ, and the corresponding page of the adjacent book in the Y-direction is recorded while being shifted by the small angle −ϕ/2. When forming the new book M1P1, the angular error signal is generated by receiving the diffracted beams from the recorded books M0P0 and M0P1. As a result, the recorded angle of the page of the book M1P1 becomes intermediate between those of pages of the books M0P0 and M0P1. In other words, the angle is set to +ϕ/2 as the intermediate value between 0 and +ϕ. The aforementioned operation is repeated to realize the recording in the state where the recorded angles are different between adjacent books in the X- and Y-directions.

With the recording method as shown in FIG. 15, the book that has been just recorded is not referred. This makes it possible to preliminarily perform post-cure operation. The post-cure is the post-process for projecting the predetermined light beam after recording the information at the desired position on the optical information recording medium 200 so as not to allow further information to be recorded at the desired position. This allows the angular error signal to be generated while having the optical information recording medium 200 in the stable state, thus providing the advantage of more stable recording. In this example, the recording is performed only in the forward direction with respect to the X-direction. However, it is possible to provide the light receiver that allows the book as reference to be recorded in the direction opposite the recording direction (forward direction) so as to perform recording in both directions with respect to the X-direction.

The embodiment using the optical system according to the first embodiment has been described. However, the optical system according to the second or the third embodiment, or any other optical system may be employed in this embodiment so long as the pages for detecting the signal are recorded while being shifted by the small angle ϕ. If the optical system according to the second or the third embodiment is employed, control may be executed by combining the angular error signal with the light beam corresponding to the recovered beam detected by the detector. The diffracted beam from the book other than the one to be reproduced is detected so as to generate not only the angular error signal but also the position error signal and the focus error signal. As this embodiment relates to the angular multiplexing recording method for generating the angular error signal using the diffracted beam of the page of the recorded book, any method is available for primarily recording the book with no limitation.

Fifth Embodiment

Figure 16:
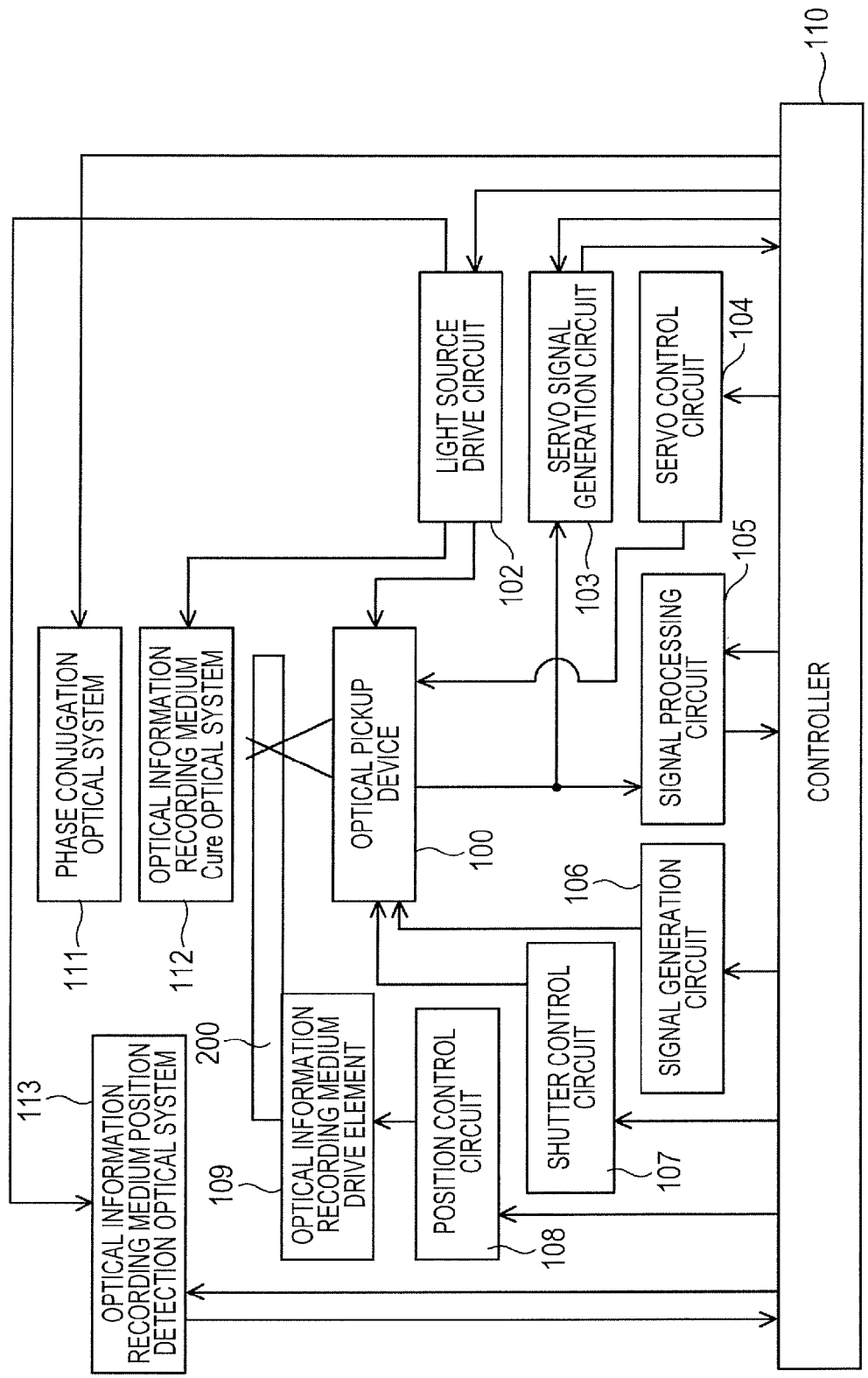
FIG. 16 is a block diagram of an optical information recording and reproducing device according to a fifth embodiment.

FIG. 16 shows a structure of an optical information recording and reproducing device according to a fifth embodiment. The optical information recording and reproducing device records and/or reproduces the information signal by forming the hologram on the optical information recording medium. The optical information recording and reproducing device is configured to have the mechanism/optical system, for example, an optical information recording medium drive element 109, a phase conjugate optical system 111, an optical information recording medium Cure optical system 112, and an optical information recording medium position detection optical system 113 in addition to the optical pickup device 100 as described in the respective embodiments. The optical information recording medium 200 is configured to change the relative recording/reproducing position with respect to the optical pickup device 100.

The optical pickup device 100 irradiates the optical information recording medium 200 with the reference beam and the signal beam to form the hologram so as to record the information signal. The device irradiates the hologram on the optical information recording medium 200 with the reference beam to reproduce the information signal. Circuits as described below are provided as the control system of the recording and reproducing operations, and are controlled by a controller 110.

The information signal to be recorded is transmitted to the spatial light modulator (29 of FIG. 1) in the optical pickup device 100 via a signal generation circuit 106 so that the signal beam is modulated by the spatial light modulator. When reproducing the information signal recorded on the optical information recording medium 200, the phase conjugate beam of the reference beam emitted from the optical pickup device 100 is generated by the phase conjugate optical system 111. The phase conjugate beam denotes the light wave that proceeds in the inverse direction while holding the same wavefront as that of the input beam. The reference beam reflected by the galvanometer mirror 40 described referring to FIG. 1 corresponds to the phase conjugate beam. The diffracted beam (recovered beam) generated by the phase conjugate beam is detected by the image sensor (41 of FIG. 1) in the optical pickup device 100 so that a signal processing circuit 105 generates the reproduction signal.

A light source drive circuit 102 supplies predetermined light source drive current to light sources in the optical pickup device 100, the optical information recording medium Cure optical system 112, and the optical information recording medium position detection optical system 113. The light beam with predetermined intensity is emitted from the respective light sources. A shutter control circuit 107 controls the time for opening and closing the shutter (13 of FIG. 1) within the optical pickup device 100 so as to adjust the time taken for irradiating the optical information recording medium 200 with the reference beam and the signal beam. The optical information recording medium Cure optical system 112 generates the light beam used for the pre-cure and post-cure operations on the optical information recording medium 200. The pre-cure denotes the pre-process for preliminarily projecting the predetermined light beam before irradiating the desired position of the optical information recording medium 200 with the reference beam and the signal beam. The post-cure denotes the post-process for projecting the predetermined light beam so as not to allow the information to be recorded once it has been recorded on the desired position of the optical information recording medium 200. The optical information recording medium position detection optical system 113 detects a general position of the optical information recording medium 200, and allows the position control circuit 108 to adjust the general position of the optical information recording medium 200 using the detection signal.

The recording method using hologram is capable of recording the information with extra-high density. However, the method significantly narrows the acceptable error with respect to inclination and displacement of the optical information recording medium 200. For this reason, this embodiment is configured to generate the angular error signal and the position error signal using the signal output from the optical pickup device 100.

A servo signal generation circuit 103 generates the angular error signal for servo control using the signal output from the photodetector 50. A servo control circuit 104 corrects the amount of angular shift of the reference beam via the angular variable element such as the galvanometer mirror in the optical pickup device 100.

The optical pickup device 100, the phase conjugate optical system 111, the optical information recording medium Cure optical system 112, and the optical information recording medium position detection optical system 113 may have some or all of the optical systems combined into a single structure for simplification.

The optical information recording and reproducing device according to this embodiment includes the optical pickup device according to the first to the fourth embodiments so that the angular error signal is generated using the signal output from the photodetector in the optical pickup device. This makes it possible to realize high-speed reproduction and to provide the best reproduction signal using the aforementioned angular error signal.

It is to be understood that the present invention is not limited to any of the aforementioned embodiments, and may include various modified examples. The aforementioned embodiments have been described in detail for the purpose of providing a comprehensible explanation of the present invention, and are never limited to the one provided with all the structures as described above. It is possible to add the structure of any one of the embodiments to that of the other embodiment. Alternatively, a part of the structure of any one of the embodiments may be added to, deleted from, and replaced with the other structure of the embodiment.

What is claimed is:

1. A holographic optical pickup device for recording an information signal by irradiating an optical information recording medium with a reference beam and a signal beam to form a hologram, or reproducing the information signal by irradiating the hologram on the optical information recording medium with the reference beam, comprising:
    a light source for emitting a light beam;
    a split element for splitting the light beam emitted from the light source into the signal beam and the reference beam;
    an angular variable element for changing an incident angle of the split reference beam to the optical information recording medium;
    a spatial light modulator for adding the information signal to be recorded to the split signal beam;
    an objective lens which irradiates the optical information recording medium with the signal beam to which the information signal is added;
    an image sensor that detects a diffracted beam generated from a region to be reproduced through the objective lens, and forms the diffracted beam into a reproduction signal when irradiating the optical information recording medium with the reference beam; and
    a photodetector different from the image sensor, which detects the diffracted beam generated from a plurality of recorded regions in the optical information recording medium when irradiating the optical information recording medium with the reference beam,
    wherein an angular error signal for controlling the angular variable element is generated using a signal detected by the photodetector.

2. The holographic optical pickup device according to claim 1, further comprising a spatial filter that reflects the diffracted beam of the optical information recording medium, which has been generated from a region other than a region to be recorded and reproduced,
    wherein the photodetector includes a plurality of light receivers to detect the diffracted beam generated from a plurality of regions other than the region to be recorded and reproduced, which has been reflected by the spatial filter.

3. The holographic optical pickup device according to claim 2, wherein a plurality of light receivers of the photodetector detect the diffracted beam generated from a plurality of regions adjacent to the region to be recorded and reproduced in the optical information recording medium.

4. The holographic optical pickup device according to claim 1, wherein the photodetector further includes a light receiver that detects the diffracted beam generated from a region to be reproduced in reproduction.

5. The holographic optical pickup device according to claim 4, further comprising a prism that allows incidence of the diffracted beam generated from the optical information recording medium via the objective lens, and splits the diffracted beam to the photodetector.

6. The holographic optical pickup device according to claim 1, wherein when forming the hologram two-dimensionally on the optical information recording medium, some of the plurality of light receivers of the photodetector are arranged at positions shifted in a recording direction with respect to the region to be recorded and reproduced, and others of the plurality of light receivers of the photodetector are arranged at positions shifted in a direction orthogonal to the recording direction.

7. The holographic optical pickup device according to claim 1, wherein when forming the hologram two-dimensionally on the optical information recording medium, a plurality of light receivers of the photodetector are arranged in a recording direction, while being positionally shifted in a direction orthogonal to the recording direction with respect to the region to be recorded and reproduced.

8. The holographic optical pickup device according to claim 2, wherein the angular error signal is generated from a differential signal of a plurality of signals derived from the light receiver among the plurality of light receivers of the photodetector, which receives the diffracted beam from the region other than the region to be recorded and reproduced.

9. An optical information recording and reproducing device that records an information signal by forming a hologram on an optical information recording medium, or reproduces the information signal from the hologram on the optical information recording medium, comprising:
    the holographic optical pickup device according to claim 1;
    a signal generation circuit that transmits the information signal to be recorded to the spatial light modulator in the holographic optical pickup device;
    a signal processing circuit that reproduces the information signal using a signal detected by the image sensor in the holographic optical pickup device;
    a servo signal generation circuit that generates an angular error signal of an incident angle of the reference beam using a signal detected by the photodetector in the holographic optical pickup device; and
    a servo control circuit that controls the angular variable element in accordance with the angular error signal.

10. A method of recording and reproducing optical information, which records an information signal by irradiating an optical information recording medium with a reference beam and a signal beam to form a hologram, or reproduces the information signal by irradiating the hologram on the optical information recording medium with the reference beam, comprising the steps of:

forming, in recording, the hologram by projecting the reference beam while shifting incident angles of the reference beam between adjacent recording regions by a predetermined angle;

detecting, in reproduction, a diffracted beam generated from a plurality of regions other than a region to be reproduced in the optical information recording medium upon projection of the reference beam;

generating an angular error signal indicating positional shifting of the incident angle of the reference beam from a differential signal of the detected signals; and correcting the incident angle of the reference beam in accordance with the angular error signal.

* * * * *